Nov. 4, 1924.
C. A. ZUEHLKE
1,514,497
AUTOMATIC SHIFT FOR RECEIVING TABLES
Filed Feb. 4, 1924  2 Sheets-Sheet 1
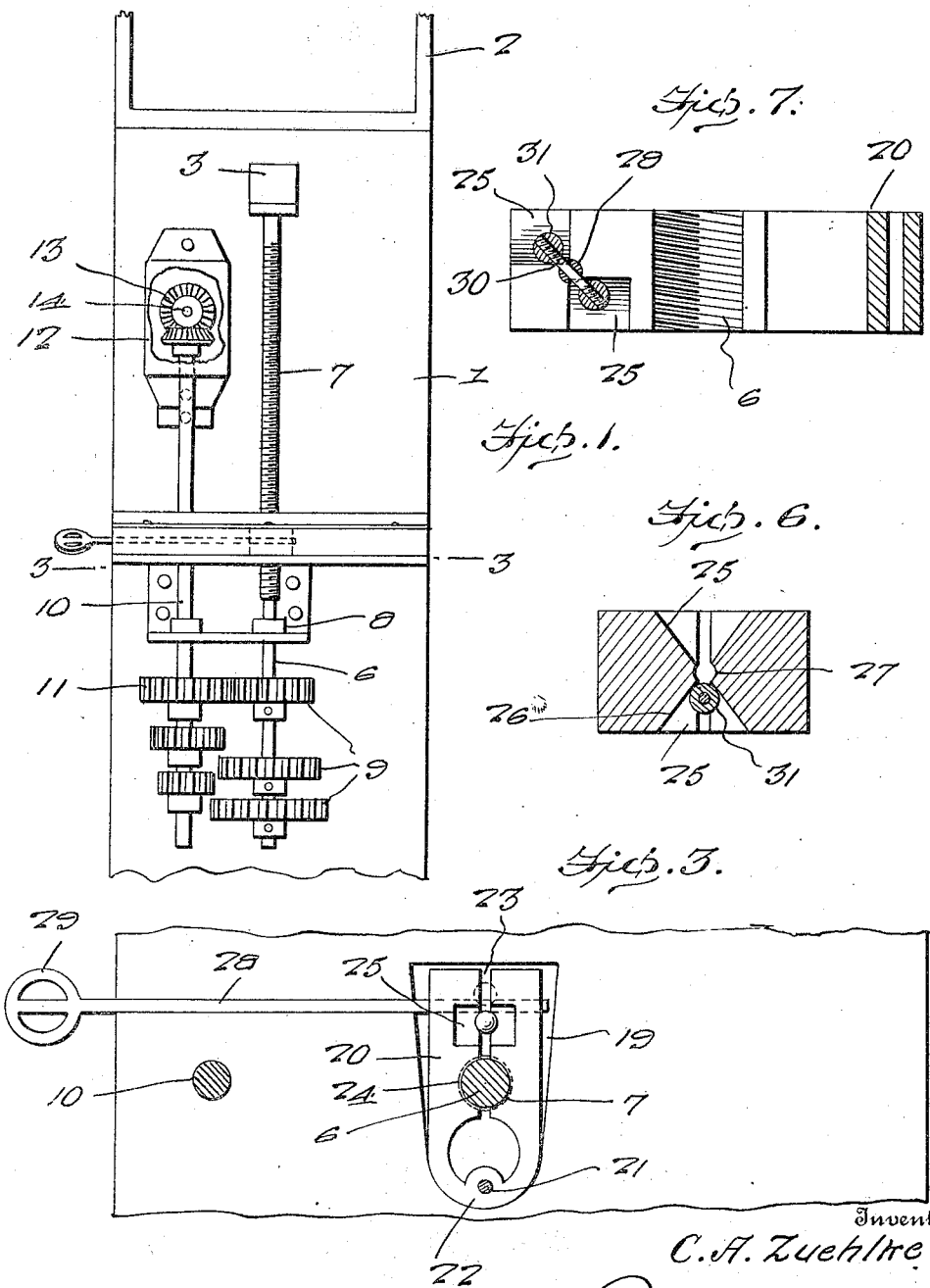
Inventor
C. A. Zuehlke

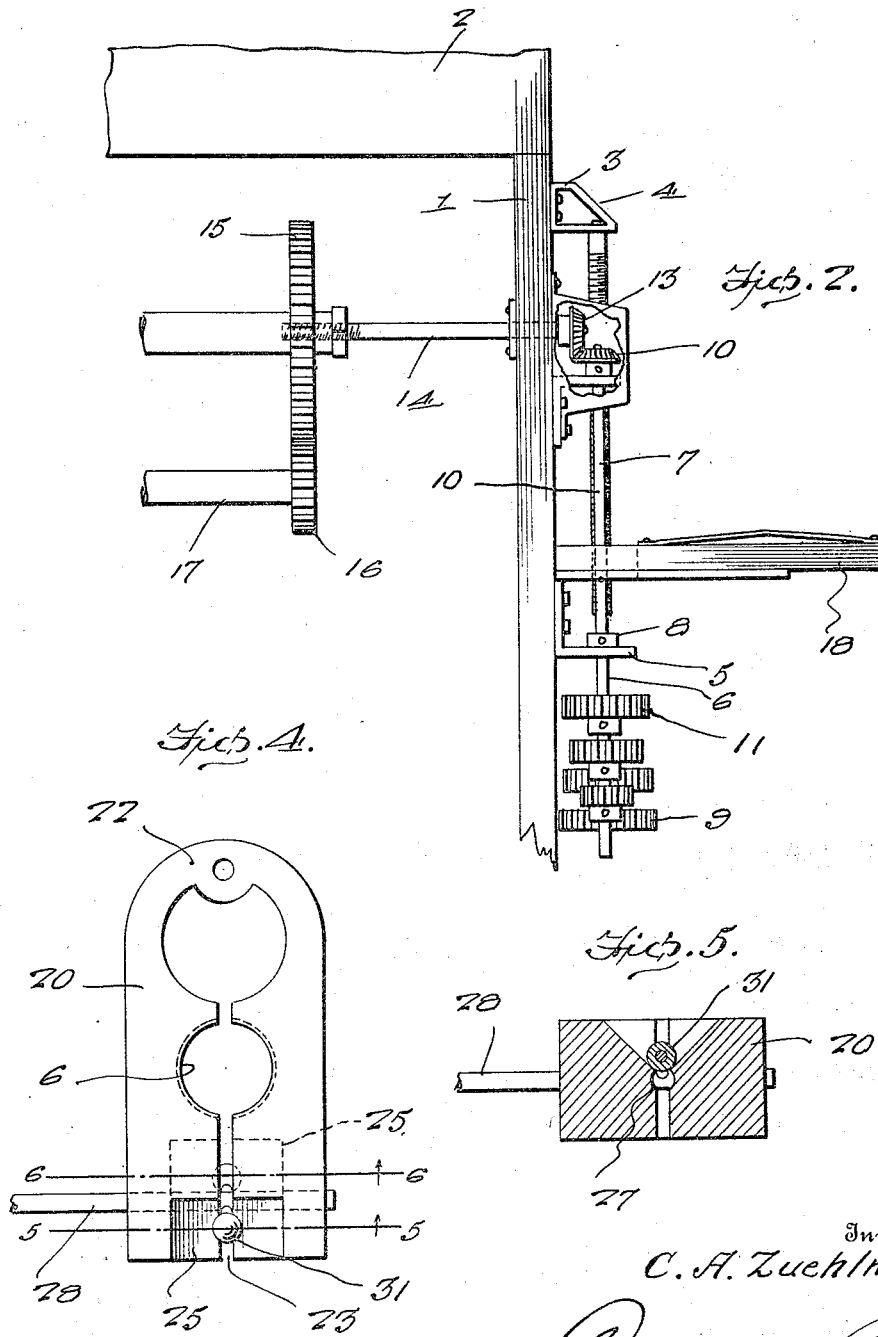

Patented Nov. 4, 1924.

1,514,497

UNITED STATES PATENT OFFICE.

CHARLES A. ZUEHLKE, OF BROOKLYN, NEW YORK.

AUTOMATIC SHIFT FOR RECEIVING TABLES.

Application filed February 4, 1924. Serial No. 680,675.

*To all whom it may concern:*

Be it known that I, CHARLES A. ZUEHLKE, a citizen of the United States, residing at Brooklyn, in the county of Kings and State of New York, have invented certain new and useful Improvements in Automatic Shift for Receiving Tables, of which the following is a specification.

This invention relates to an automatic shift for receiving tables especially adapted to be used for receiving and retaining a stack of covers to be used in the operation of bookbinding and it consists in the novel features hereinafter described and claimed.

The automatic shift is intended primarily to be applied to that form of apparatus used by bookbinders and which is known as a casemaker. The shift comprises a shelf which is mounted for vertical movement at the side of the table there being a screw journalled at the side of the table and means of a special design carried by the shelf and engageable with the screw whereby the shelf may move vertically of the table as the screw rotates. Means are provided upon the shelf for disengaging the shelf from the screw whereby the shelf may be raised or lowered by an operator. Mechanical means are provided for automatically moving or rotating the screw whereby the shelf may be raised or lowered automatically or by the use of power.

In the said automatic means for moving the shelf there is provided a system of gearing in the form of a variable speed transmission and by the use of which the rate of speed at which the screw is rotated may be regulated.

In the accompanying drawings:

Figure 1 is a fragmentary side elevational view of a table with the shelf and the shifting means applied thereto.

Figure 2 is an edge view of the same with parts broken away.

Figure 3 is an enlarged detail sectional view cut on the line indicated at 3—3 in Figure 1.

Figure 4 is a plan view of a form of nut which is used in the shift mechanism for the shelf.

Figure 5 is a transverse sectional view of the same cut on the line 5—5 of Figure 4.

Figure 6 is a similar view cut on the line 6—6 of Figure 4.

Figure 7 is a longitudinal sectional view of the said nut.

As indicated in the accompanying drawings, the casemaker's table is designed as at 1 and may be of usual form. A trough 2 is mounted upon the table 1 and may be used for retaining the covers upon the table and in alinement with the stack supporting shelf as will be explained.

A bracket bearing 3 is fixed to the side of the table 1 and its upper outer corner portion is chamfered as at 4 and the said chamfered surface is located below the delivery end of the trough 2 as indicated. A bearing 5 is fixed to the table 1 at a point below the bracket bearing 3. A shaft 6 is journalled in the bearings 3 and 5 and is provided along its length and between the said bearings with a thread 7. The shaft 6 is held in a proper position in the bearings by means of a collar 8 which is fixed to the shaft and which bears against the upper face of the bearing 5, as shown in Figure 2. Gear wheels 9 are mounted upon the lower portion of the shaft 6 and the said gear wheels are of different diameters. A shaft 10 is journaled upon the table 1 and is disposed parallel with the shaft 6 and spaced therefrom. Gear wheels 11 are carried at the lower portion of the shaft 10 and are of different diameters. The teeth of the gear wheels 11 may be placed in mesh with the teeth of the juxtaposed gear wheels 9 upon the shaft 6 whereby the shaft 10 may be rotated at the constant rate of speed but the rate of speed at which the shaft 6 rotates with relation to the shaft 10 may be varied, in a usual manner. A bevelled pinion 12 is carried at the upper end of the shaft 10 and meshes with the teeth of a similar pinion 13 mounted upon a horizontally disposed shaft 14 journaled in the table 1. A gear wheel 15 is carried by the shaft 14 and meshes with a gear wheel 16 which is mounted upon a power shaft 17. Therefore it will be seen that rotary movement may be transmitted from the shaft 17 to the shaft 14 and through the intermeshing pinion such movement is transmitted to the shaft 10 and through the variable speed transmission gears 11 and 9, rotary movement is transmitted from the shaft 10 to the shaft 6 and the screw 7 carried thereon.

A shelf 18 is mounted for vertical sliding movement upon the shaft 10 and is provided with an intermediately located opening 19 through which the threaded portion 7 of the shaft 6 passes. A nut 20 is pivoted to the shelf 18 as at 21 and is located in the opening 19 thereof. The nut 20 is made of spring material as for instance resilient steel. The nut 20 is elongated and is provided at one end with arcuate edge 22 which lies opposite a similar edge of the end wall of the recess 19 in the shelf 18 as best shown in Figure 3 of the drawing. The end portion of the nut 20 opposite that end at which the arcuate surface 22 is provided is slotted longitudinally as at 23 and the said slot is in alinement with the pivot 21 which holds the nut 20 in the recess 19. The opposite side portions of the nut 20 are provided at points between the ends of the slot 23 with threaded concavities 24 which are adapted to receive the opposite side portions of the threaded part of the shaft 6 whereby the threads of the concavities 24 may engage the threads 7 of the said shaft. The nut 20 is further provided at its opposite sides and at points between the ends of the slot 23 with recesses 25 having converging or cam bottom wall surfaces 26 and the inner ends of the recesses 25 are spaced from each other and in said spaces are located depressions 27 which are located one at each side of the slot 23. A key 28 is journaled in the shelf 18 and one end of the said key is disposed beyond the edge of the shelf and provided with a head 29. The opposite end portion of the key 28 is disposed transversely across the opening 19 and transversely across the opposite side portions of the nut 20 and across the slot 23 provided therein. An arm 30 is disposed transversely of the key 28 and is carried by the key and the opposite end portions of the said arm 30 are disposed in the slot 23 of the nut 20. The arm 30 carries at its ends globular heads 31 which are adapted to move over the cam surfaces 26 of the recesses 25 and which may lodge in the sockets 27 provided at the opposite side portions of the nuts 20. When the globular heads 31 are in the recesses 25 the threads of the concavities 24 are in mesh with the thread 7 of the shaft 6. When the key 28 is turned by using the head 29 as a handle, the arm 30 is turned whereby the globular heads 31 move along the cam surfaces 26 of the recesses 25 and spread the opposite side portion of the nut 20 whereby the threads of the concavities 24 are moved out of mesh with the thread 7 of the shaft 6. Thus the shelf 18 may be disconnected from the shaft 6 and the said shelf may be raised or lowered manually and irrespective of the turning movement of the said shaft 6.

When the globular heads 31 enter the sockets 27 the length of the arm 30 is held transversely across the slot 23 and the opposite side portions of the nut 20 are retained in a spread condition.

When it is desired to connect the nut 20 with the shaft 6, the key 28 is turned whereby the globular heads 31 are moved out of the sockets 27 and are moved into the recesses 25 whereby the arm 30 is disposed between the inner walls of the slot 23 and the resiliency of the nut 20 causes the opposite side portions thereof to move toward each other so that the threads of the concavities 24 are brought into engagement with the threads 7 of the shaft 6 and the said nut and the shelf 18 are connected with the shaft 6 and as the shaft 6 is rotated the shelf 8 is raised or lowered according to the direction in which the shaft rotates.

As the book covers are passed from the trough 2 and deposited upon the shelf 18, they are accumulated upon the shelf in the form of a stack and as the stack grows or increases in height the shelf 18 may be lowered by the instrumentalities hereinbefore described. In that the upper outer portion of the bracket 13 is chamfered, there are no projecting parts of the bearing or bracket 3 to interfere with the movement of the book covers from the trough 2 to the shelf 18.

In a similar manner, if a stack of covers is placed upon the shelf 18 and the covers are being used successively upon the table and are being removed from the top of the stack, the shelf 18 may be elevated through the instrumentalities hereinbefore described, to at all times maintain the uppermost cover upon the stack in proper position or in convenient reach of the operator.

Having thus described the invention, what is claimed is:

A shiftable shelf structure comprising a screw shaft journaled for rotation, a shelf member having an opening through which said shaft passes, a nut of flexible material located in the recess and provided at its opposite sides with threads adapted to engage the thread of the screw shaft, a key carried by the shelf, the opposite side portions of the nut being provided with recesses having cam surfaces, sockets provided in the opposite side portions of the nut and located between the recesses thereof, the key being provided with globular heads adapted to move along the cam surfaces of the recesses to spread the opposite sides of the nut and the said heads adapted to enter the sockets to hold the opposite side portions of the nut spread apart.

In testimony whereof I affix my signature.

CHARLES A. ZUEHLKE.